United States Patent
Heizer et al.

(10) Patent No.: US 8,577,630 B2
(45) Date of Patent: Nov. 5, 2013

(54) AUTOMATIC DISCHARGE OF A FAILED BATTERY

(75) Inventors: Stephen D. Heizer, Houston, TX (US); John A. Wozniak, Houston, TX (US); Thomas P. Sawyers, Hempstead, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 491 days.

(21) Appl. No.: 12/747,549

(22) PCT Filed: Dec. 14, 2007

(86) PCT No.: PCT/US2007/087557
§ 371 (c)(1),
(2), (4) Date: Jun. 11, 2010

(87) PCT Pub. No.: WO2009/078850
PCT Pub. Date: Jun. 25, 2009

(65) Prior Publication Data
US 2010/0268494 A1    Oct. 21, 2010

(51) Int. Cl.
*G01R 21/07* (2006.01)
*G01R 21/00* (2006.01)
*G01R 21/01* (2006.01)
*G01R 21/06* (2006.01)

(52) U.S. Cl.
USPC .................. 702/63; 702/57; 702/59; 702/61

(58) Field of Classification Search
USPC ........................................ 702/63, 58, 60, 64
See application file for complete search history.

(56) References Cited

U.S. PATENT DOCUMENTS

| | | | | |
|---|---|---|---|---|
| 5,362,991 A | * | 11/1994 | Samela | 327/540 |
| 5,764,028 A | * | 6/1998 | Freiman et al. | 320/106 |
| 6,531,847 B1 | * | 3/2003 | Tsukamoto et al. | 320/135 |
| 6,891,353 B2 | * | 5/2005 | Tsukamoto et al. | 320/136 |
| 2005/0077878 A1 | * | 4/2005 | Carrier et al. | 320/134 |
| 2005/0134227 A1 | * | 6/2005 | Wozniak | 320/134 |
| 2007/0247114 A1 | * | 10/2007 | Makwana et al. | 320/116 |

FOREIGN PATENT DOCUMENTS

| | | |
|---|---|---|
| KR | 10-1997-030973 | 6/1997 |
| KR | 10-2004-0013354 | 2/2004 |
| WO | WO2006/115342 | 11/2006 |

OTHER PUBLICATIONS

International Search Report & Written Opinion dated Sep. 9, 2008, pp. 10.

* cited by examiner

*Primary Examiner* — Marc Armand
*Assistant Examiner* — Felix Suarez

(57) ABSTRACT

A system comprises a battery cell, control logic, and a battery drain latch circuit. The control logic is coupled to the battery cell and determines whether a battery pack has experienced a failure condition. The battery drain latch circuit is activated by the control logic, upon detection of a failure condition, to cause the battery cell to drain energy therefrom.

17 Claims, 2 Drawing Sheets

AUTOMATIC DISCHARGE OF A FAILED BATTERY

BACKGROUND

The battery in a battery-operated device (e.g., notebook computer) may, upon occasion, fail. While such failures usually do not pose safety issues, a failed battery may generate excessive heat or pose other potentially undesirable effects.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection. Additionally, the term "system" refers to a collection of two or more hardware and/or software components, and may be used to refer to an electronic device, such as a computer, a portion of a computer, a combination of computers, etc.

DETAILED DESCRIPTION

Figure 1:
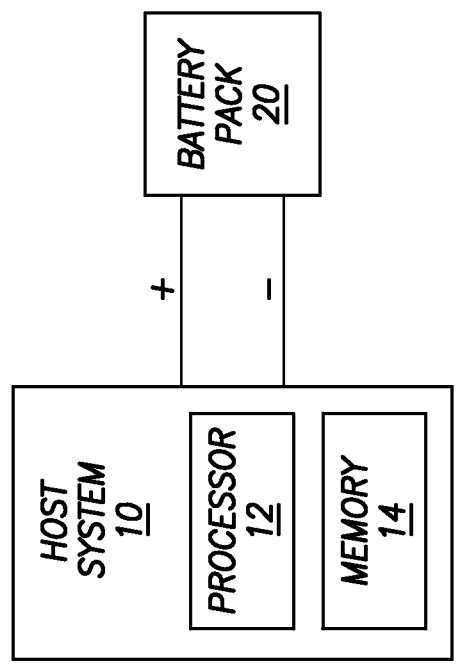
FIG. 1 shows a system diagram in accordance with various embodiments.

FIG. 1 illustrates a host system 10 in accordance with various embodiments. As shown, host system 10 comprises a processor 12, a memory device 14, and possibly other components. Host system 10 may be implemented as a computer (e.g., a notebook computer) or other type of battery-operated device. A battery pack 20 is also shown electrically coupled to the host system 10 for providing operational power to the host logic (e.g., processor 12, memory device 14) of the host system 10. The host system 10 thus receives its operating electrical power from the battery pack 20. The battery pack 20 may be incorporated into, or mated to, the housing of the host system 10 (e.g., internal to the host system 10), or may be provided separate from the host system's housing (e.g., external battery pack). In some embodiments, the battery pack 20 may be readily removable from the host system such as is typical of many notebook computers. The battery pack 20 comprises one or more battery cells. That is, the battery pack 20 may comprise a single cell battery or may comprise a multi-cell pack (e.g., 6-cell, 8-cell pack).

Figure 2:
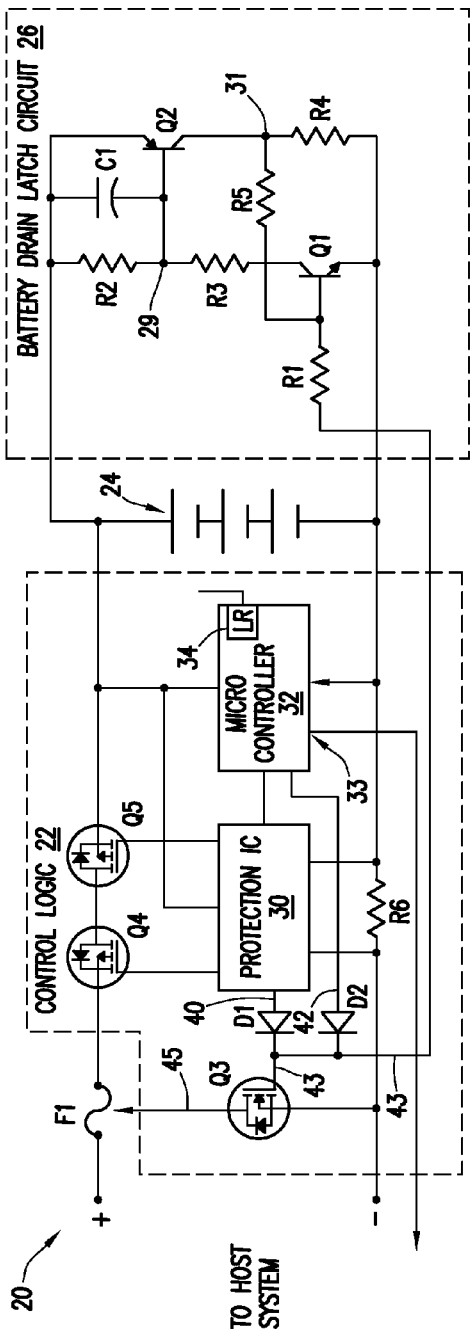
FIG. 2 shows a schematic diagram of a battery pack employing a battery drain latch circuit in accordance with various embodiments.

FIG. 2 illustrates an embodiment of the battery pack 20. As shown, battery pack 20 comprises a fuse F1, control logic 22, one or more battery cells 24, and a battery drain latch circuit 26. The fuse F1 is a three-terminal fuse. One of the terminals receives a control signal 45 which causes the fuse to "blow" thereby effectively disconnecting the battery pack 20 from the host system 10. In the embodiment of FIG. 2, a low logic level for control signal 45 causes the fuse F1 to blow.

In the illustrative embodiment of FIG. 2, the control logic 22 comprises transistors Q3, Q4, and Q5, a resistor R6, a protection circuit 30 (e.g., an integrated circuit ("IC")), and a microcontroller 32. The microcontroller 32 monitors the capacity of the battery cells 24 and provides a digital interface 33 to the host system 10. Via the interface, the microcontroller 32 provides data indicative of battery current, voltage, capacity, and other or different data to the host system 10.

Resistor R6 comprises a current sense resistor (e.g., 0.05 ohms), the voltage across which is proportional to the current to/from the battery cells 24. The protection circuit 30 receives the voltage across resistor R6. The protection circuit 30 is capable of detecting an over-current condition via the voltage from the resistor R6. If the voltage across resistor R6 is greater than a threshold programmed into the protection circuit 30, the protection circuit asserts an output failure signal 40 via diode D1. In the illustrative embodiment of FIG. 2, the failure signal 40 is asserted high to indicate a battery pack failure, although in other embodiments, a low value of failure signal 40 may indicate the occurrence of a failure.

The microcontroller 32 also is capable of detecting one or more battery pack failures such as an over-voltage condition. If the microcontroller 32 detects such a failure, the microcontroller also asserts a failure signal 42 via diode D2. Diodes D1 and D2 effectively "wire OR" the failure signals 40 and 42 into one failure signal 43 which drives the gate of transistor Q3. If either of the failure signals 40 or 42 are asserted high, transistor Q3 is turned "on" which pulls the control signal 45 for fuse F1 low. Forcing control signal 45 low causes the fuse F1 to blow as explained above.

Failure signal 43 is also provided as an input into the battery drain latch circuit 26. The latch circuit 26 in the illustrative embodiment of FIG. 2 comprises a two-transistor latch. The two transistors are NPN transistor Q1 and PNP transistor Q2 as shown. The failure signal 43 drives the base of NPN transistor Q1 via resistor R1. Once the transistor Q1 is turned on, which will be the case when the failure signal 43 is asserted high to indicate a battery failure mode, current from the battery cells 24 will begin to flow from the battery cells 24 through resistors R2 and R3 and through transistor Q1. The voltage developed at node 29 between resistors R2 and R3 drives the base of PNP transistor Q2. When current flows through resistors R2 and R3, the voltage at node 29 drops to a point at which PNP transistor Q2 turns on. Once transistor Q2 turns on, current from the battery cells 24 also begins to flow through transistor Q2 and resistor R4. In the embodiment of FIG. 2, resistor R4 represents the main battery dissipating component as most of the battery's energy will be dissipated by resistor R4.

With transistor Q2 on, the voltage at node 31 becomes sufficiently high so as to provide current through resistor R5 back into the base terminal of transistor Q1. The base-driving current through resistor R5 operates to keep transistor Q1 in an "on" state even if the failure signal 43 is deasserted by either or both of the protection circuit 30 and/or microcontroller 32. The operation of the battery drain latch circuit 26 is thus regenerative to keep the latch activated to continue to drain the battery even following deassertion of the failure signal 43 which caused the battery cells 24 to begin to drain in the first place. The power dissipated by resistor R4 will decrease over time as the voltage of the battery cells reduces.

Figure 3:
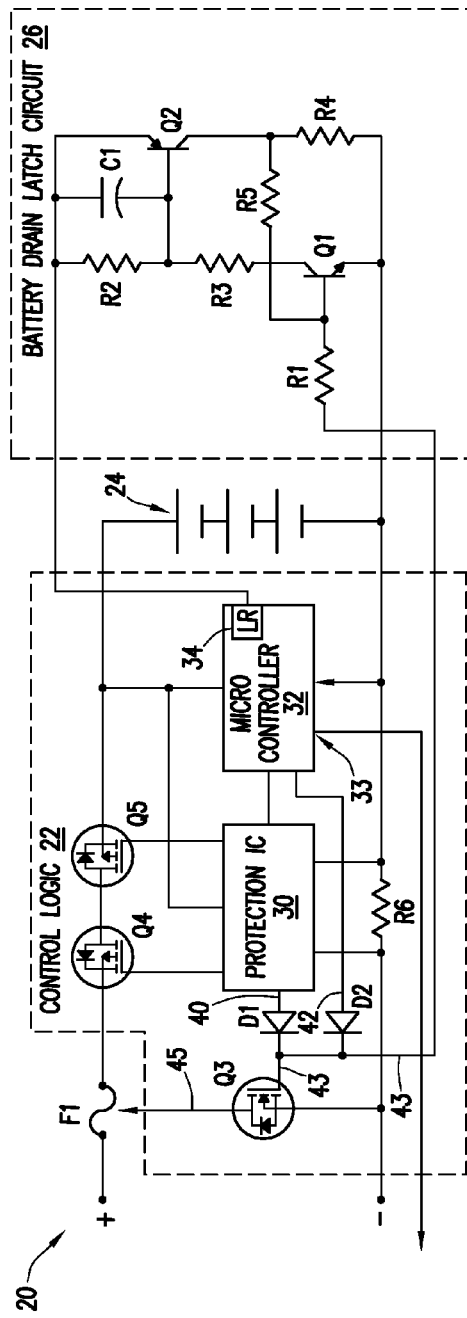
FIG. 3 shows a schematic diagram of a battery pack employing a battery drain latch circuit in accordance with alternative embodiments.

FIG. 3 is an alternative embodiment. A difference between the embodiment of FIGS. 2 and 3 is that, while in FIG. 2 the battery drain latch circuit 26 connects directly to the positive terminal of the battery cells 24, in FIG. 3, the battery drain latch circuit 26 connects to a voltage regulator 34 in the control logic 22. In the illustrative embodiment of FIG. 3, the voltage regulator 34 comprises a linear regulator implemented in the microcontroller 32. In other embodiments, however, the linear regulator is provided apart from microcontroller such as in protection IC 30. The linear regulator 34 generally functions to provide a regulated output voltage (e.g., 3.3 VDC). The regulated output voltage from the linear regulator 34 is used to provide the battery-draining current in the embodiment of FIG. 3. Thus, the battery cells 24 power the microcontroller 32 and the linear regulator 34 in the microcontroller begins to provide current (generated by the battery cells) into the battery drain latch circuit 26. Because the linear regulator 34 provides a relatively constant output voltage, the current drawn from the battery cells 24 in FIG. 3 is relatively constant, as is the power dissipation of resistor R3. In the embodiment of FIG. 3, energy is dissipated in both linear regulator 34 and resistor R4.

Figure 4:
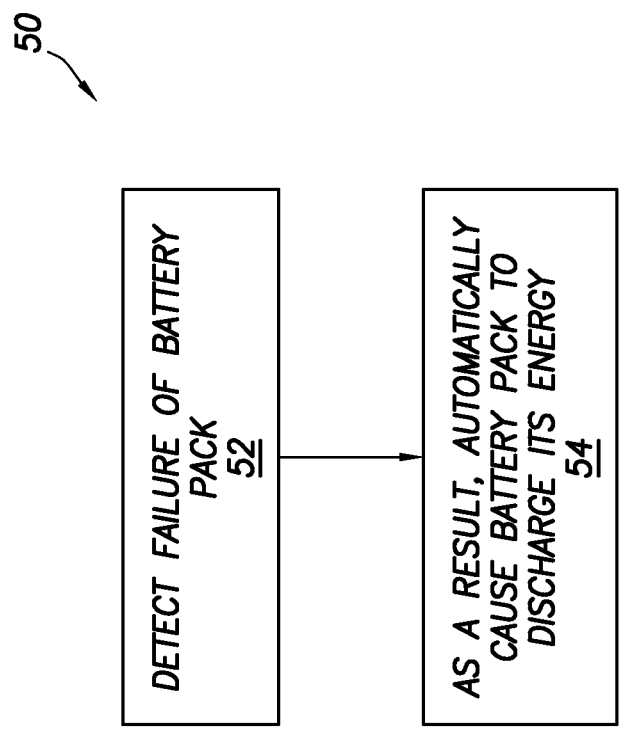
FIG. 4 shows a method in accordance with various embodiments.

FIG. 4 illustrates a method 50 in accordance with various embodiments. As shown, method 50 comprises detecting a failure of the battery pack (52). As a result of detecting a failure, the method further comprises automatically causing the battery pack to discharge its energy (54).

In some embodiments, all of the battery pack's energy stored in cells 24 is discharged. In other embodiments, most (e.g., more than 95%) of the cells' energy is discharged. In various embodiments, at least enough energy is discharged from the battery pack 20 to render the pack generally incapable of producing any undesirable problems while in the failure mode.

For the embodiments described herein, the battery pack 20 will take a finite amount of time to drain from a fully charged state, but generally less time than would occur without the implementation of the techniques described herein. In some embodiments, the battery pack 20 may take a few hours, a few days, or a week to drain.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
   a battery cell;
   control logic coupled to the battery cell, said control logic determines whether a battery pack has experienced a failure condition; and
   a battery drain latch circuit that is activated by said control logic, upon detection of the failure condition, to cause said battery cell to drain energy.

2. The system of claim 1 wherein said battery drain latch circuit comprises a two-transistor latch.

3. The system of claim 1 wherein said battery drain latch circuit receives an input failure signal from said control logic, said input failure signal indicating an occurrence of the failure condition.

4. The system of claim 3 wherein said battery drain latch circuit continues to cause energy to be drained from said battery cell even upon a deassertion of the input failure signal.

5. The system of claim 1 wherein said battery drain latch circuit is electrically connected to a terminal of the battery cell.

6. The system of claim 1 wherein said control logic comprises a voltage regulator that provides a regulated voltage from said control logic, and wherein the battery drain latch circuit is electrically connected to a terminal of the voltage regulator.

7. The system of claim 1 wherein said battery drain latch circuit causes said battery cell to drain all of said energy in said battery cell, or all but 1% or less of said energy in said cell.

8. The system of claim 1 wherein said battery drain latch circuit comprises a resistor that dissipates energy drained from said battery cell.

9. The system of claim 1 further comprising host logic that receives operational power from said battery cell.

10. A system, comprising:
    a microcontroller to detect a failure condition of a battery pack; and
    a battery drain circuit to automatically causing the battery pack to dissipate energy contained therein based on the detection of a failure condition by the microcontroller.

11. The system of claim 10 wherein the battery drain circuit is also for activating a latch.

12. The system of claim 11 wherein the battery drain circuit is to dissipate energy through a resistor.

13. The system of claim 10 wherein the battery drain circuit is also for dissipating energy from a voltage regulator in the battery pack.

14. A method, comprising:
    detecting a failure condition of a battery pack;
    as a result of detecting the failure condition, asserting a failure signal to a latch; and
    the latch causing energy to automatically be drained from the battery pack.

15. The method of claim 14 further comprising the latch continuing to cause the battery pack to continue to be drained upon deassertion of the failure signal.

16. The method of claim 15 wherein the latch causing energy to automatically be drained from the battery pack comprises dissipating energy through a resistor in the latch.

17. The method of claim 15 wherein the latch causing energy to automatically be drained from the battery pack comprises dissipating energy from a voltage regulator in said battery pack.

* * * * *